United States Patent

[11] 3,586,401

| [72] | Inventor | Homer E. Gravelle |
| | | Denver, Colo. |
| [21] | Appl. No. | 838,497 |
| [22] | Filed | July 2, 1969 |
| [45] | Patented | June 22, 1971 |
| [73] | Assignee | Sundstrand Corporation |

[54] BEARING ASSEMBLY
9 Claims, 5 Drawing Figs.

[52] U.S. Cl. .................................................... 308/160
[51] Int. Cl. ................................................ F16c 17/06
[50] Field of Search ................................. 308/160, 9, 73

[56] References Cited
UNITED STATES PATENTS

| 1,117,503 | 11/1914 | Kingsbury | 308/160 |
| 2,169,296 | 8/1939 | Smith | 308/160 |
| 2,507,021 | 5/1950 | Lakey | 308/160 |
| 3,023,055 | 2/1962 | Thompson | 308/160 |
| 3,142,519 | 7/1964 | Abramovitz | 308/160 |
| 3,259,441 | 7/1966 | Newell | 308/160 |

FOREIGN PATENTS

| 197,179 | 5/1923 | Great Britain | 308/73 |
| 642,806 | 6/1962 | Canada | 308/160 |
| 1,306,740 | 9/1962 | France | 308/73 |

Primary Examiner—Martin P. Schwadron
Assistant Examiner—Frank Susko
Attorney—Hofgren, Wegner, Allen, Stellman & McCord ABSTRACT: A full film pivoted bearing pad, radial and thrust bearing assembly in which both the radial bearing pads and the thrust bearing pads are individually provided with lubricant supplied to grooves therein and in which the thrust bearing pads may be selectively removed to tailor the bearing capacity for a specific application and to provide the lowest practical power consumption.

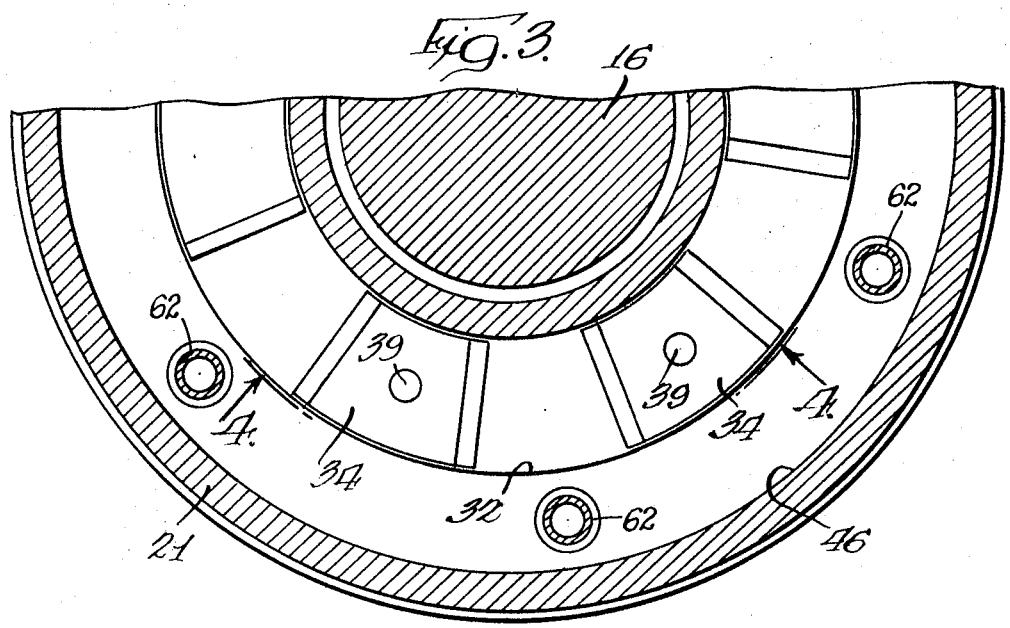
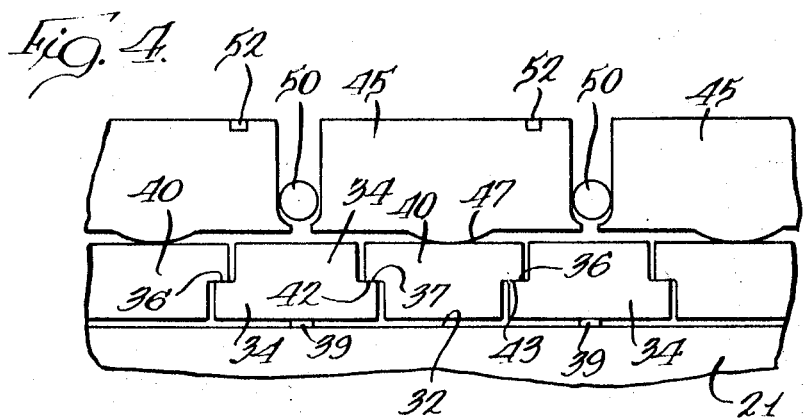
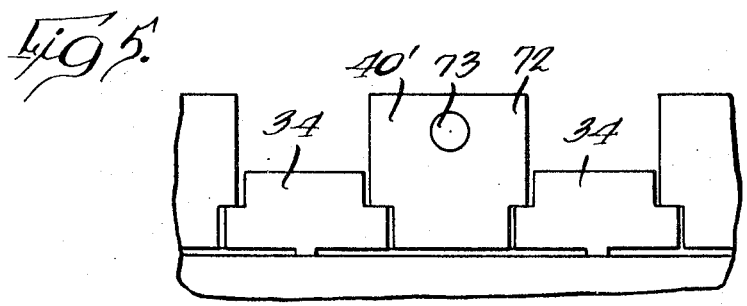

3,586,401

BEARING ASSEMBLY

BACKGROUND OF THE PRESENT INVENTION

In prior full film pivoted bearing assemblies there is a considerable power loss associated with high-speed churning of the lubricating fluid in the nonworking areas of the bearing. Moreover, close clearances and seals are required to maintain the lubricant in the bearing cavity which increases the power loss associated with these prior bearings.

In prior bearing designs it was also necessary, in order to vary bearing capacity, to select for a particular application a different bearing design thereby requiring the manufacture of an entire set of parts for each bearing having a different capacity in order to minimize the power consumption of prior art bearings.

It is a primary object of the present invention to provide a pivoted pad bearing assembly in which the viscous drag losses of the bearing are minimized.

SUMMARY OF THE PRESENT INVENTION

In accordance with the present invention, the viscous drag losses are minimized in a pivoted pad bearing assembly by providing pads which are individually fed lubricant and in which the pads may be sized, without varying the other bearing parts, to meet the specific capacity demands of the application. This minimizes the nonworking areas of the bearing to avoid the high power losses otherwise associated with high-speed churning in the nonworking areas of the bearing. This bearing design requires no close running clearances or seals that are required in prior designs which serves to further reduce the parasitic power losses associated with prior art constructions.

Moreover, the bearing power consumption and losses may be further reduced in the present construction through the provision of optional upper levelers that are independently mounted and serve the function of conventional levelers except that they eliminate the requirement for an associated bearing pad. In this manner, the number of bearing pads may be reduced to achieve a bearing capacity tailored to the specific application rather than providing an excessive bearing pad area which would increase the bearing power loss.

The thrust portion of the bearing assembly according to the present invention includes a plurality of pie-shaped lower levelers arranged in an annular groove in the bearing frame. Alternately disposed with respect to these lower levelers are stepped upper levelers which are similar in configuration to the lower levelers and are supported on the lower levelers. The lower levelers have retaining pins that loosely retain the lower levelers in the bearing frame, but the upper levelers are solely supported on the lower levelers so that they freely transmit force equally to the two adjacent flanking lower levelers. The bearing pads which slidably engage the main thrust runner on the associated shaft, are loosely retained with respect to the bearing frame and have pivotal buttons which engage the associated upper leveler and transfer the axial shaft load thereto. The bearings pads may be of different size depending upon the desired bearing capacity without changing the remaining parts of the bearing assembly.

Moreover, substitute upper levelers are provided which are gimbaled on a radial axis within the bearing frame rather than being retained in position by engagement with an associated bearing pad. Nevertheless, they continue to function to transfer load from one lower leveler to the other in conventional fashion, but they advantageously permit the elimination of the associated bearing pad. Ideally, of course, the number of bearing pads removed should result in a symmetrical bearing pad configuration. For example, for a bearing with a full complement of six pads, the number of pads removed should leave, for example, two, three, or four pads. Operation with one or five remaining pads is possible, but unsymmetrical load reactions will result.

BRIEF DESCRIPTION OF THE DRAWINGS

FIG. 3 is a fragmentary section taken generally along lines 3-3 of FIG. 1;

FIG. 4 is a fragmentary section taken generally along lines 4-4 of FIG. 3 showing the upper and lower levelers and bearing pads in a developed view; and FIG. 5 is a view of the upper and lower bearing pads with the substituted upper levelers shown.

DETAILED DESCRIPTION OF THE PREFERRED EMBODIMENT

Figure 1:
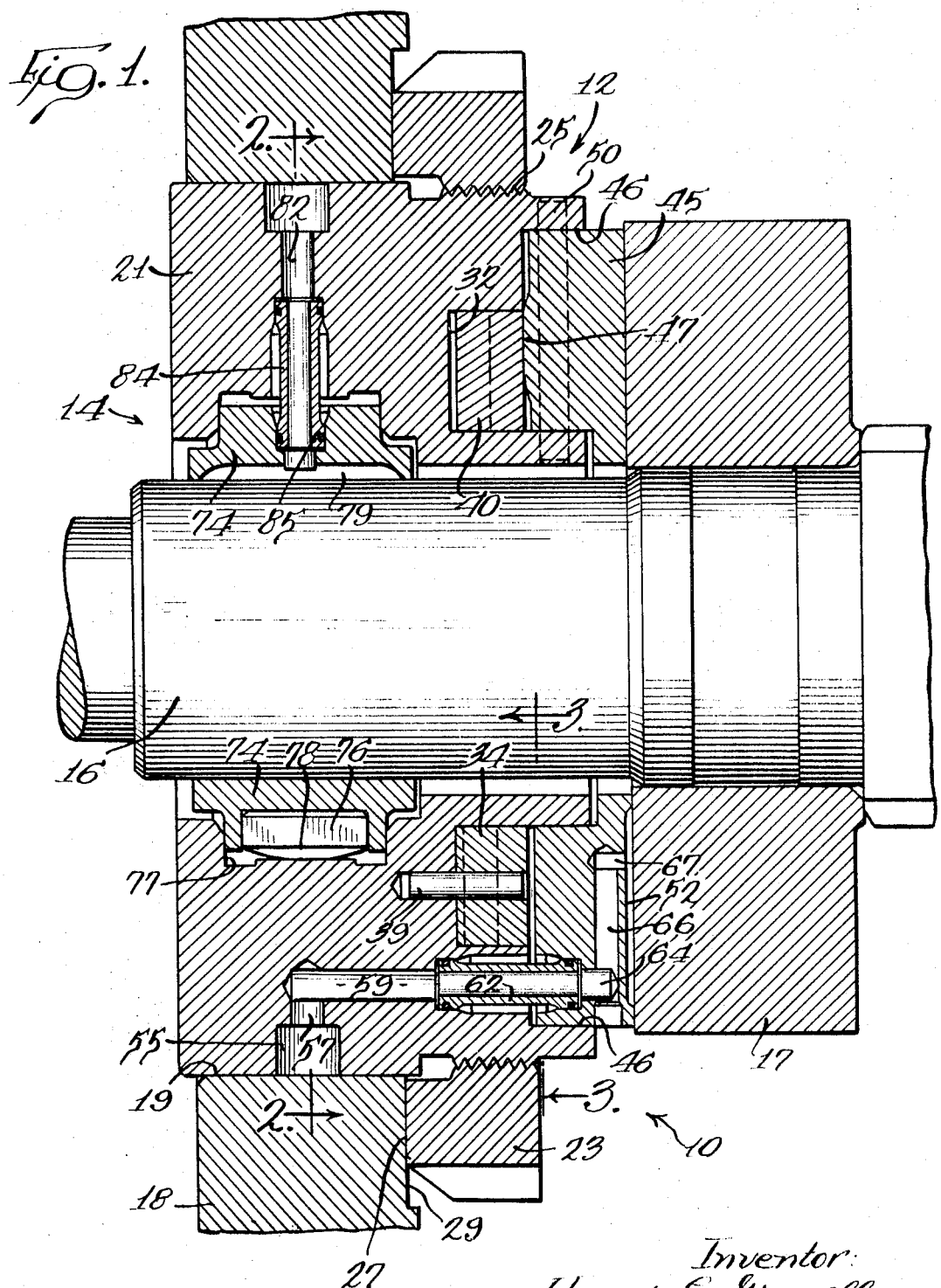
FIG. 1 is a longitudinal cross section of the present bearing assembly.
Figure 2:
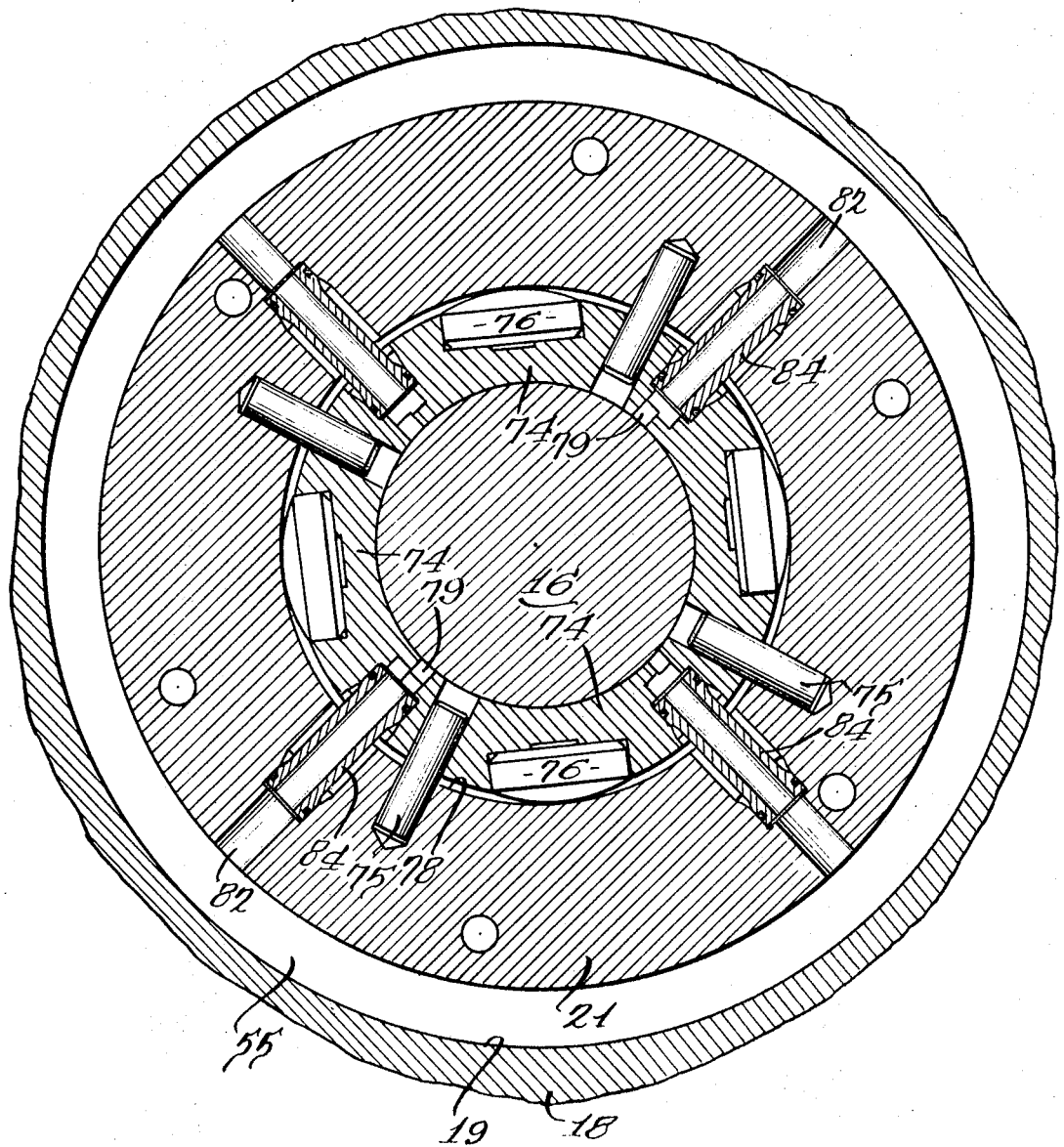
FIG. 2 is a cross section taken generally along lines 2-2 of FIG. 1 showing the journal bearing.

Referring to FIGS. 1 and 2 a thrust and radial bearing assembly 10 is seen to consist generally of a thrust bearing portion 12 and a radial bearing portion 14, respectively, axially and radially supporting a rotating shaft 16. Shaft 16 carries an annular thrust runner 17 which forms a part of the thrust bearing portion 12. The bearing assembly 10 is supported in a housing member 18 having an annular aperture 19 therein.

Seated within the annular aperture or opening 19 in housing portion 18 is an annular bearing frame 21 which is closely received in housing 18, but is permitted limited axial adjustment with respect thereto through the provision of an adjusting ring 23, which threadably engages the bearing frame 21 as at 25 and has a radial surface 27 which reacts against a complementary radial surface 29 on the housing 18. By rotating the ring 23 the entire bearing assembly 10 may be adjusted axially with respect to the shaft 16 to provide an appropriate clearance or preload between the bearing assembly and the shaft 16 in an axial direction.

The bearing assembly frame 21 has an axially facing annular groove 32, which is shown in both FIGS. 1 and 3. As shown more clearly in FIG. 3, the annular groove 32 has received therein a plurality of lower leveler segments 34 which are pie-shaped in configuration. The lower levelers, as shown in FIG. 4, have stepped shoulders 36 and 37 at each side thereof.

For the purpose of loosely retaining the lower levelers 34 within the groove 32, retaining pins 39 are provided which are supported in the bearing frame 21 and project axially approximately centrally within the groove 32. The pins 39 are loosely received in complementary openings in the lower levelers 34 so that they serve a retaining function but do not absorb the tilting loads imposed upon the lower levelers, and in this manner force is transmitted from the lower levelers to the upper levelers.

Disposed alternately in the groove 32 with respect to the lower levelers 34 are upper levelers 40 also of pie-shaped configuration, as shown clearly in FIG. 4. The upper levelers 40 have at their sides stepped portions 42 and 43 rearwardly facing, which engage respectively the stepped portions or shoulders 37 and 36 on the lower levelers. As shown in FIG. 4, the upper levelers 40 are entirely supported on the lower levelers 34 so that any load imposed thereon is transmitted equally to the adjacent lower levelers, which as is known in the art provides a load equalization function.

As seen more clearly in FIGS. 1 and 4, a plurality of arcuate thrust bearing pads 45 are received in an annular groove 46 in the bearing frame 21. Groove 46 has its inner surface complementary with the inner surface of groove 32 and its radially outward surface extending somewhat beyond the groove 32 as shown in both FIGS. 1 and 3. The bearing pads 45 are arcuate in configuration and are equal in number, when the full number of pads are employed, to the number of upper levelers 40. Carried by the pads 45 are pivot buttons 47 which have spherical outer surfaces engaging the adjacent upper levelers 40 for the purpose of transmitting an axial load thereto.

For the purpose of retaining the thrust bearing pads 45 within the groove 46, retaining pins 50 are provided which are radially disposed in the bearing frame 21 and which pass between the bearing pads 45. Further, it should be understood that one retaining pin 50 is provided for each bearing pad and that the bearing pads loosely receive the pins 50 so that the pins do not interfere with the transmittal of force from the thrust runner 17 through the bearing pads 45 to the upper levelers 40, nor do the pins 50 interfere appreciably with the ability of the pads 45 to tilt.

As thus far described, the function of the thrust bearing portion 12 is as follows. The force transmitted to any of the thrust pads 45 by the thrust runner 17 in an axial direction is transferred to the associated upper levelers 40. Half of this force is transmitted to each of the adjacent lower levelers 34 upon which it rests. In turn, the other ends of these adjacent lower levelers apply the transmitted forces to the two upper levelers 40 on the other sides thereof. These upper levelers in turn react against their associated bearing pads 45 and in this manner the load is thereby equalized in bearing pads.

For the purpose of lubricating the bearing pads 45 a shallow radially extending groove 52 is provided in each of the pads as shown in FIG. 1. The groove 52 extends radially almost the entire length of the pad but is narrow and has a length to width ratio that exceeds 10. For the purpose of supplying lubricating fluid to the grooves 52 an annular supply passage 55 is provided in the periphery of the bearing frame 21. A suitable supply of fluid (not shown) is provided through the housing member 18 to supply lubricating fluid to supply passage 55.

Communicating with supply passage 55 are radial passages 57 which in turn communicate with axial passages 59 opening to a portion of the groove 46 between the groove 32 and the outer annular portion of groove 56. The number of passages 59 correspond in number to the number of pads 45, it being understood that each pad 45 has only one radial lubrication groove 52. For the purpose of conveying fluid between the passage 59 and the pads 45 hollow lubrication ferrules 62 are seated within a stepped portion of passages 59 and are received in stepped dead end bores 64 within the pads 45. Bores 64 communicate with grooves 52 through radially extending passages 66 and axially extending passages 67 opening to the inner portion of grooves 52. The ferrules 62 are sized so they do not interfere with the transmission of loads from the thrust runner 17 to the upper levelers 40.

As may be seen more clearly in FIG. 4 there is a considerable space between the bearing pads 45 providing a large drain for the lubricant passing from each individual pad after wetting the entire surface of the pad. This eliminates viscous drag losses associated with nonworking but wetted shaft areas encountered in conventional flooded cavity bearing designs.

The working area of the bearing pads 45 may be varied, i.e., made as large or small as desired, to avoid the viscous drag forces associated with the nonworking areas of the bearing pads, since after the lubrication fluid passes over each bearing pad it goes to drain.

As described above, the viscous drag forces and the power consumption of the bearing may also be reduced if a lower capacity bearing is acceptable by eliminating one or more of the thust bearing pads 45. To accomplish this, as shown in FIG. 5, a substitute upper leveler 40' is provided. The upper leveler 40' is similar in construction to the leveler 40 but has an elongated upper portion 72 to provide sufficient axial length for the provision of an opening for receiving a gimbal pin 73 seated within the bearing frame 21 in approximately the same plane as the retaining pins 50. It should be understood that the pins 73 serve merely a retaining function, normally effected by the associated bearing pads 45, and that the pins do not restrict the transmittal of force from one lower leveler 34 to the other adjacent one. In effect, the pins 73 provide the pivotal gimbal mounting for the substitute levelers 40'. The number of substitute levelers 40' depends firstly upon the desired bearing capacity, and secondly upon the desirability of a symmetrical bearing pad configuration, since it is desirable to have bearing pad symmetry to equalize pad loading.

The radial bearing portion 14 includes an inwardly facing annular groove 77 in the bearing frame 21 which receives a plurality of arcuate radial bearing pads 74. Pads 74 each have a pivotal button 76 for the purpose of permitting some tilting action and for transmitting force to the bottom 78 of groove 77 in the bearing frame 21.

For the purpose of preventing rotation of the bearing pads 74 antirotation pins 75 are seated within the bearing frame 21 and project radially between the bearing pads 74. There are four bearing pads illustrated in FIG. 2.

The manner of lubricating the bearing pads 74 is similar to the manner of lubricating the thrust bearing pads 45. Toward this end, each of the bearing pads has adjacent one end thereof an elongated axially extending lubrication groove 79 which has closed ends. For the purpose of supplying lubrication to the grooves 79 from the main lubrication supply passage 55, radial passages 82 are provided corresponding in number with the number of pads 74. For the purpose of conveying fluid from the passages 82 to the pads 74 hollow lubrication ferrules 84 are provided which are seated within the stepped passages 82 at one end and at their other ends is a stepped passage 85 in the associated bearing pads 74. The ferrules 84 are seated in the passages 82 and 85 in a manner so they do not interfere with the tilting movement of the bearing pads 74. As with the thrust bearing pads 45, the arcuate spaces between the bearing pads 74 provide a drain for each of the pads so that each pad is individually lubricated.

The above-described bearing assembly permits the area of the shaft 16 between the thrust bearing portion 12 and the radial bearing portion 14 to rotate in air rather than liquid lubricant, and thus provides an additional saving in friction power.

I claim:

1. A shaft bearing assembly comprising: a plurality of first leveler means, a plurality of second leveler means, said leveler means being arranged to transfer loads from the first leveler means to the second leveler means, a plurality of bearing pads supported at least partly on said leveler means, said bearing pads having bearing surfaces, and means for eliminating one or more bearing pads from the assembly including an independently supportable member which may be substituted for one of said leveler means, said member being spaced entirely below said surfaces.

2. A shaft bearing assembly as defined in claim 1, wherein said bearing pads are arcuate thrust bearing pads having axial bearing surfaces, a bearing frame member, means retaining said bearing pads in said bearing frame member end permitting limited pivotal movement of the thrust bearing pads.

3. A shaft bearing assembly as defined in claim 2, including radially extending lubricating grooves in each of said bearing surfaces, and means for supplying lubricating fluid to said lubricating grooves.

4. A shaft bearing assembly as defined in claim 1 including bearing frame means, the first of said leveler means being retained relative to said frame means, the second of said leveler means being freely supported on the first of said leveler means and being disposed in alternated relation therewith, said bearing pads being supported on said second leveler means, said means for eliminating the necessity for one or more bearing pads including a member adapted to be substituted for one of said second leveler means.

5. A shaft bearing assembly as defined in claim 4 wherein said member is supported in said bearing frame means for movement about a generally radial axis, said member engaging the adjacent first leveler means on each side thereof.

6. A thrust bearing assembly for varying load service, comprising: bearing frame means, a generally annular groove in said bearing frame means, a plurality of lower levelers in annular array and retained in said annular groove, a plurality of upper levelers alternately spaced with respect to and supported in the adjacent lower levelers, a plurality of thrust bearing pads supported for limited pivotal movement on said upper levelers, said thrust bearing pad having bearing surfaces, means for reducing the number of bearing pads required including a substitute upper leveler, said substitute upper leveler extending entirely below the bearing surfaces, and means supporting said substitute upper leveler in said bearing frame means.

7. A thrust bearing assembly as defined in claim 6 wherein said means for supporting the substitute upper leveler includes means pivotally mounting said substitute leveler for pivoting movement about a generally radial axis.

8. A thrust bearing assembly as defined in claim 6, wherein said lower levelers are stepped pie-shaped segments, said upper levelers being stepped pie-shaped segments and supported wholly on the stepped portions of the lower levelers, and pin means axially extending from said groove and loosely received in each of said lower levelers for retaining the levelers in position.

9. A thrust bearing assembly as defined in claim 8 including a generally radially extending lubrication groove in each of said bearing pads, and means for feeding fluid to said lubrication grooves including a hollow ferrule projecting axially from said bearing frame means into each of said bearing pads.